United States Patent
Adams

Patent Number: 5,139,217
Date of Patent: Aug. 18, 1992

[54] PASSIVE DAMPER FOR SPIN STABILIZED PROJECTILES

[75] Inventor: Guy E. Adams, Minnetonka, Minn.

[73] Assignee: Alliant Techsystems, Inc., Minnetonka, Minn.

[21] Appl. No.: 616,053

[22] Filed: Nov. 20, 1990

[51] Int. Cl.$^5$ .............................................. B64G 1/38
[52] U.S. Cl. .................................. 244/164; 244/165; 244/170
[58] Field of Search ............... 244/93, 164, 165, 170, 244/158 R, 3.23, 3.15, 3.21; 74/573

[56] References Cited

U.S. PATENT DOCUMENTS

| | | | |
|---|---|---|---|
| 2,856,142 | 10/1958 | Haviland | 244/93 |
| 3,034,745 | 5/1962 | Stewart | 244/170 |
| 3,048,350 | 8/1962 | Cutler | 244/158 R |
| 3,433,534 | 3/1969 | Mercer | 244/170 |
| 3,716,206 | 2/1973 | Lynch et al. | 244/170 |
| 3,733,923 | 5/1973 | Goodrich et al. | 244/170 |
| 3,758,051 | 9/1973 | Williams | 244/170 |

*Primary Examiner*—Galen Barefoot
*Attorney, Agent, or Firm*—Whitham & Marhoefer

[57] ABSTRACT

A stabilizer comprised of a pair of toroidal fluid passages filled with a viscous fluid orthogonally mounted with respect to one another on a spin stabilized projectile. One torus is rigidly attached to the projectile and aligned with the x axis of the projectile and the other torus is similarly attached and aligned along the y axis.

8 Claims, 2 Drawing Sheets

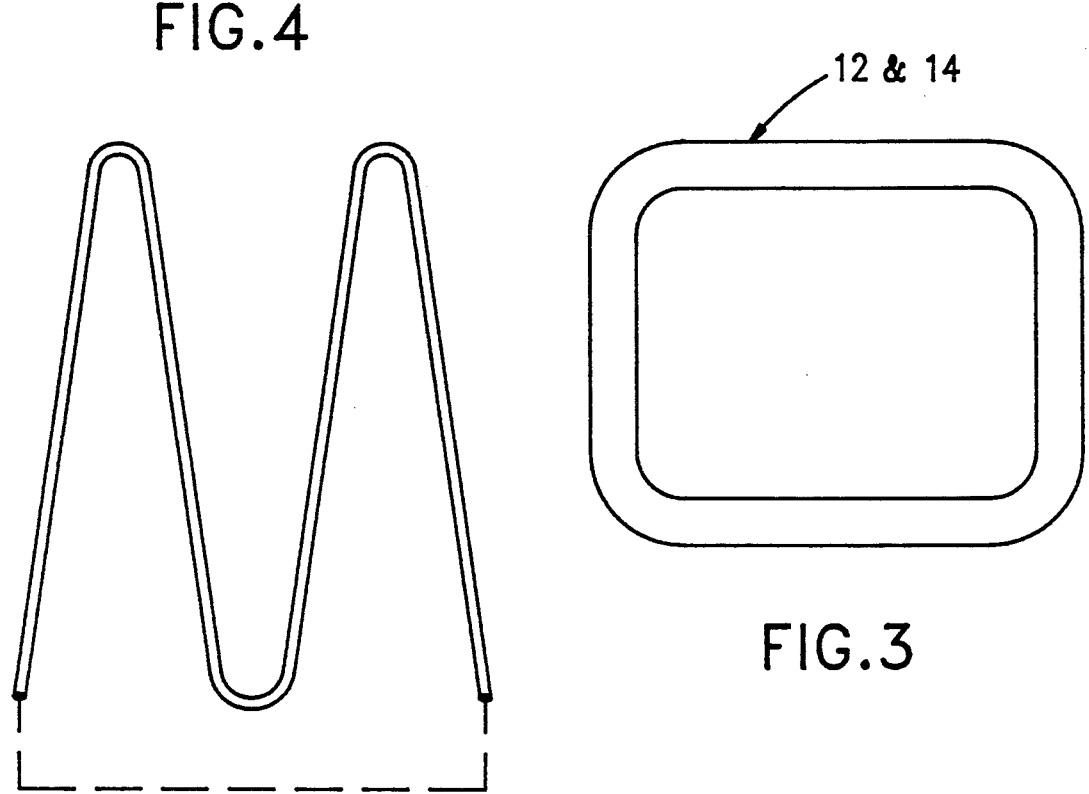

PASSIVE DAMPER FOR SPIN STABILIZED PROJECTILES

BACKGROUND OF THE INVENTION

1. Field of the Invention

The present invention generally relates to a wobble damping system for spin-stabilized airborne projectiles and more particularly to an improved passive system.

2. Description of the Prior Art

As will be appreciated by those skilled in the art, a large class of projectiles in free flight through the air rely on spin stabilization to prevent excessive wobble while in flight. Through the use of rifling, upon launch the projectile is spun about its longitudinal axis. Despite spin stabilization, forces on the projectile while in flight will cause the projectile to wobble (i.e., yaw and pitch with respect to the spin axis) and it is desirable to dampen this oscillatory motion quickly.

U.S. Pat. No. 3,034,745 issued to D. J. Stewart discloses a spin axis stabilized space vehicle with a passive spin axis stabilizer comprised of a ring with internal raceways positioned coaxially with the spin axis. A dense fluid partially fills the raceways. Wobble induced sloshing of the fluid in the raceways provides a damping action.

The spin axis stabilizer proposed in the Stewart patent is not altogether satisfactory for many applications. Its ratio of generated damping force to stabilizer weight is low. The center of gravity and axis of the stabilizer changes its axis relative to the spin axis. Further, the stabilizing force generated in response to various wobble conditions is not predictable.

SUMMARY OF THE INVENTION

An object of this invention is the provision of a passive spin axis stabilization system which has a relatively high ratio of generated damping force to weight ratio. Another object of the invention is the provision of a passive spin axis stabilizer whose center of gravity and axes remain fixed relative to the spin axis.

Briefly, this invention contemplates the provision of a stabilizer comprised of a pair of toroidal fluid passages filled with a viscous fluid orthogonally mounted with respect to one another on a spin stabilized projectile. One torus is rigidly attached to the projectile and aligned with the x axis of the projectile and the other torus is similarly attached and aligned along the y axis. The viscous fluid filling each torus is free to flow along the centerline of the toroidal passage. Wobble of the projectile about its spin axis (z axis) is resolvable as a sinusoidal motion about both the x axis and the y axes. These motions produce sinusoidally varying accelerations and resultant velocities of each of the pair of toroids about their respective axes. As a result, the viscous fluid filling each toroid flows relative to the wall of the passage in a sinusoidal fashion in terms of its direction and velocity but out of phase with the motion of the wall. This generates a viscous torque between the wall and the fluid which quickly dampens the oscillation and hence the wobble.

BRIEF DESCRIPTION OF THE DRAWINGS

The foregoing and other objects, aspects and advantages will be better understood from the following detailed description of a preferred embodiment of the invention with reference to the drawings, in which:

FIG. 3 is a schematic drawing of a rectangular toroidal element which may be used in the system of FIG. 1.

FIG. 4 is a schematic drawing of a multi-turn toroidal element.

FIG. 5 is a schematic drawing of means to maintain the toroids filled despite expansion and contraction of the fill fluid.

DETAILED DESCRIPTION OF A PREFERRED EMBODIMENT OF THE INVENTION

Figure 1:
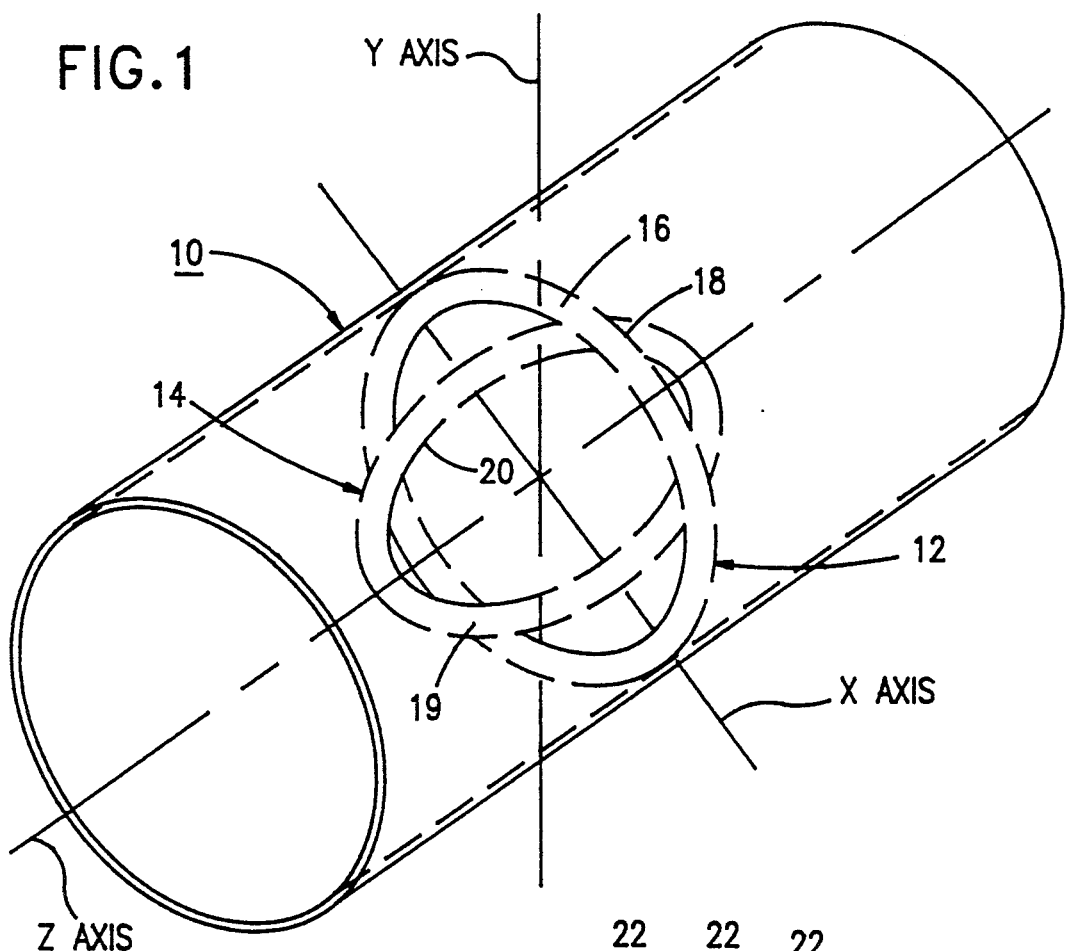
FIG. 1 is a schematic perspective view of a spinning projectile with a passive stabilizer system in accordance with the teachings of this invention.

Referring now to FIG. 1, a spin stabilized cylindrical projectile 10 spins about its longitudinal axis z while in flight. Rigidly secured to the interior wall of the projectile 10 is a passive wobble damping system comprised of toroids 12 and 14 each filled with a viscous fluid. The toroids 12 and 14 are orthogonally disposed with respect to one another and with respect to the spin axis z. Toroids 12 and 14 may be tubes. Toroid 12 defines a fluid passageway 16 bounded by an inner wall surface 18. The fluid passageway 16 lies substantially in a plane which contains the yaw axis of the projectile labeled here as the y axis. Similarly, toroid 14 defines a fluid passageway 19 bounded by the inner surface 20 of the tube wall. The fluid passageway 19 lies substantially in a plane which contains the pitch axis labeled here as the x axis. Preferably, the toroids are mounted so that the x, y, and z axes intersect at the centroid of the projectile 10. The viscous fluid, such as oil, which fills completely the passageways flows freely in them.

As will be appreciated by those skilled in the art, wobble in a spin stabilized airborne projectile is an oscillatory motion which may be resolved into two sinusoidal components; an oscillation about the yaw axis y and an oscillation about the pitch axis x. These yaw and pitch components of the wobble motion result in a corresponding motion of the toroids 12 and 14. The friction coupling between the wall of each passageway and the viscous fluid filling it produces a corresponding oscillatory flow of fluid, which due to inertial effects, is out of phase with the motion of the toroids. The torque between the viscous fluid and the wall of the tube quickly dampens the wobble.

Figure 2:
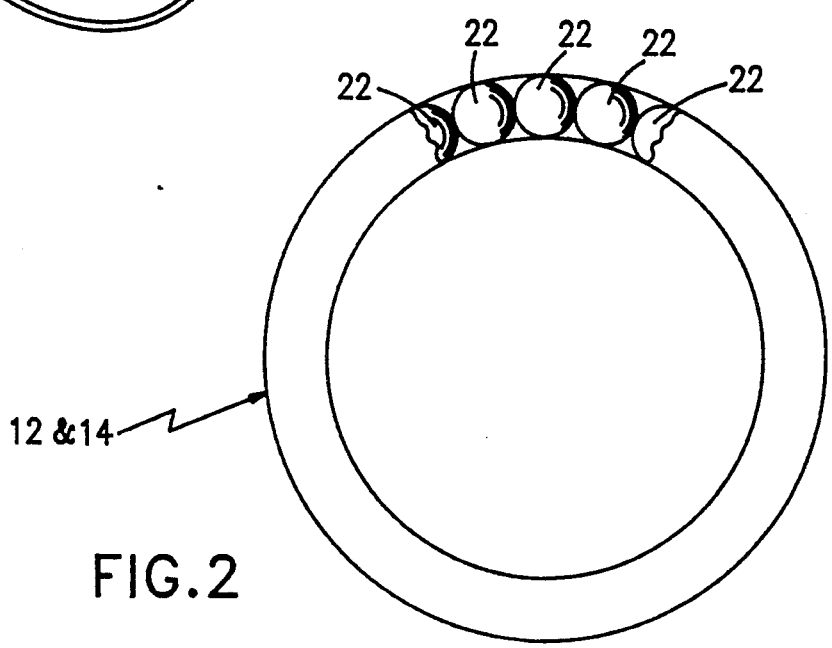
FIG. 2 is a schematic drawing of a preferred alternate embodiment of a toroidal element for use in the passive damper system of FIG. 1.

Referring now to FIG. 2, the amount of damping is a function of the viscosity of the fluid used to fill the tube and mass of the damping fluid. As shown in FIG. 2, metal balls 22 may be added to the fluid in the fluid passageway to increase the apparent viscosity and mass of the fluid. Preferably, the size of the balls is selected relative to the size of the passageway and to each other such that the balls move freely in the passageway in contact with one another continuously (as shown) so that there is no possibility of movement of the balls relative to one another.

Referring now to FIG. 3, it shows a rectangular configuration for the torus 12 and 14 which is advantageous in certain applications. This rectangular configuration conforms to the longitudinal cross-sectional shape of a cylindrical projectile and can provide a path length greater than the projectile diameter. Other forms of liquid-filled tubes such as elliptical, oval, hexagonal and the like are also satisfactory.

The fluid path can be lengthened by forming a multi-turn toroidal passage such as illustrated in FIG. 4. Lengthening the fluid path increases the total mass of fluid in the system and the surface area of contact between the fluid and the wall of the toroid, thus increasing the damping torque. The ends of toroidal passages are connected as illustrated schematically by the dotted line in FIG. 4. It will be appreciated that the path is such that the fluid flows in a continuous path. If desired the ends can be connected by a second multi-turn toroidal path.

Since it is important that the fluid passageways be completely filled with fluid for satisfactory operation of the damping system, it may be necessary in some applications to compensate for changes in viscous fluid volume with temperature. FIG. 5 illustrates two schemes which may be used in some cases separately and in other cases in combination to ensure the passages are filled when ambient temperature changes. A heating coil 30 supplied from a suitable source such as a battery 32 can be used to maintain the temperature of the fluid in the passageway during in-flight operation. If desired, a thermostat may be used to control the temperature. A pressurized reservoir 36 coupled to the passageway by a thin tube 38 may also be used to maintain the passageways filled with a viscous fluid despite changes in fluid volume due to ambient changes in temperature.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. In a projectile designed to be spin stabilized in flight about a longitudinal axis, a system for damping oscillatory motion about a yaw axis and a pitch axis, each of said axes being orthogonally disposed with respect to the other, the combination comprising:
   a first passageway filled with viscous fluid free to flow in said passageway;
   said first passageway secured to said projectile with said passageway disposed in a plane substantially parallel to said yaw axis;
   a second passageway filled with a viscous fluid free to flow in said passageway;
   said second passageway secured to said projectile with said passageway disposed in a plane substantially parallel to said pitch axis; and
   said first and second passageways filled with a plurality of balls which can move freely in the passageway in continuous contact with one another.

2. In a projectile designed to be spin stabilized as in claim 1 wherein said first and second passageways are respectively continuous closed passageways.

3. In a projectile designed to be spin stabilized in flight as in claim 2 wherein said first and second passageways conform to the cross-sectional shape of said projectile.

4. In a projectile designed to be spin stabilized as in claim 2 wherein said first and second passageways are circular.

5. In a projectile designed to be spin stabilized as in claim 1 wherein said first and second passageway is rectangular.

6. In a projectile designed to be spin stabilized as in claim 2 wherein said first and second passageways include a plurality of turns.

7. In a projectile designed to be spin stabilized as in claim 1 further including means to maintain said passageways filled with said viscous fluid.

8. In a projectile designed to be spin stabilized as in claim 5 further including means to maintain said passageways filled with said viscous fluid.

* * * * *